No. 771,953. PATENTED OCT. 11, 1904.
F. J. WARREN.
PAVEMENT OR ROADWAY.
APPLICATION FILED JUNE 21, 1902.
NO MODEL.
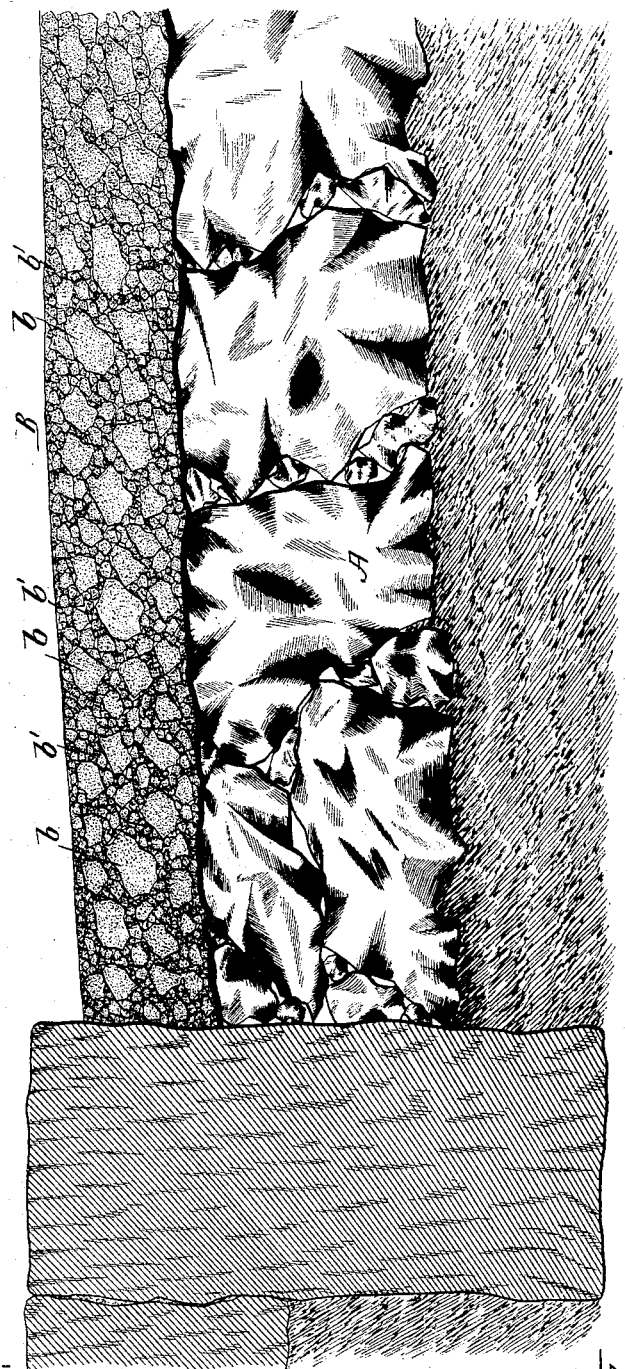

No. 771,953. Patented October 11, 1904.

UNITED STATES PATENT OFFICE.

FREDERICK J. WARREN, OF NEWTON, MASSACHUSETTS.

PAVEMENT OR ROADWAY.

SPECIFICATION forming part of Letters Patent No. 771,953, dated October 11, 1904.

Application filed June 21, 1902. Serial No. 112,714. (No model.)

*To all whom it may concern:*

Be it known that I, FREDERICK J. WARREN, a citizen of the United States, and a resident of Newton, in the county of Middlesex and State of Massachusetts, have invented a new and useful Improvement in Pavements or Roadways, of which the following is a full, clear, and exact description, reference being had to the accompanying drawing, forming a part of this specification, in explaining its nature.

This invention is an improvement upon that described in my application for Letters Patent of the United States executed of even date herewith, No. 112,713, (Case C.) In said application I have described a pavement and ingredients therefor the essential elements of which are natural stony ingredients or elements having large porosity, the pores of which are filled in whole or in part with a bituminous oil or composition for the purpose of weatherproofing the ingredients and providing them with cohesion and wearing properties which they would not otherwise possess.

My present invention relates to a pavement in which the mineral ingredients or elements are entirely artificial.

In practicing the invention I take sand of the desired quality and combine with it hard bituminous cement to form a mass or body of combined sand and bitumen which is by compression or other means made sufficiently hard to have some analogy with the mineral ingredients referred to in my said application and also having certain valuable wearing properties inherent to the composition. The ingredients are prepared from such a body by making it into the desired degree of coarseness and fineness. The ingredients should not be so hard as to powder or become friable in use at ordinary temperatures. Neither should they become plastic or soft, as they are calculated to withstand the wear of traffic and to take the place of the stony ingredients which I have described in various patents granted to me. These ingredients of combined sand and bituminous composition are used in the construction of the pavement as though they were stony elements and are combined with a bituminous composition sufficiently plastic to unite them and fill the voids between them when subjected with them to sufficiently heavy pressure—such, for instance, as that which would be provided by a heavy steam-roller. To make the body, I take the sand and intimately associate it at a suitable temperature with the bituminous composition in proportions which may vary considerably, according to circumstances and according to the specific character of the constituents selected. The composition is preferably solidified while in a plastic state under hydraulic or other high pressure, and thus converted into hard slabs or bodies of great density and hardness, and these bodies are then broken into ingredients of varying sizes and adapted to be combined in the base of a wearing layer of a street sheet-pavement to form a body having inherent stability and the interstices of which are adapted to be filled with a uniting bituminous composition, the whole being applied to any desired thickness upon a properly-prepared subfoundation, upon which it is compacted and to which it is united by heavy pressure—such, for instance, as that obtained by the use of a fifteen or twenty ton steam-roller.

In the drawing I have shown in a conventional way a cross vertical section of a pavement having the features of my invention.

Referring to the drawing, A represents the subfoundation of a street sheet pavement or roadway; B, the wearing-section thereof; b, the independent bituminous and sand ingredients forming the base, and b' the bituminous uniting composition.

Having thus fully described my invention, I claim and desire to secure by Letters Patent of the United States—

1. The wearing-section of a street sheet-pavement, particles of a crushed or broken artificial combination of sand and bituminous composition forming the mineral or wearing ingredients thereof, and a bituminous composition uniting said ingredients and filling the voids between them.

2. The wearing-section of a street sheet-pavement, particles of a crushed or broken artificial combination of sand and bituminous composition forming the mineral or wearing ingredients thereof, and a bituminous composition uniting said ingredients and filling the voids between them, the said ingredients and composition being compacted together upon a subfoundation under heavy pressure.

3. The wearing-section of a street sheet-pavement consisting of mineral ingredients of such sizes and so proportioned as to give the pavement an inherent stability, said ingredients being an artificial combination of sand and bituminous composition, and a bituminous cement or binder uniting said ingredients being present in quantities sufficient to fill the voids between said artificial ingredients.

FREDERICK J. WARREN.

In presence of—
RALPH L. WARREN,
ALBERT C. WARREN.